April 27, 1954  T. ADDISON  2,676,500
BORING MILL TOOLHOLDER
Filed June 20, 1951
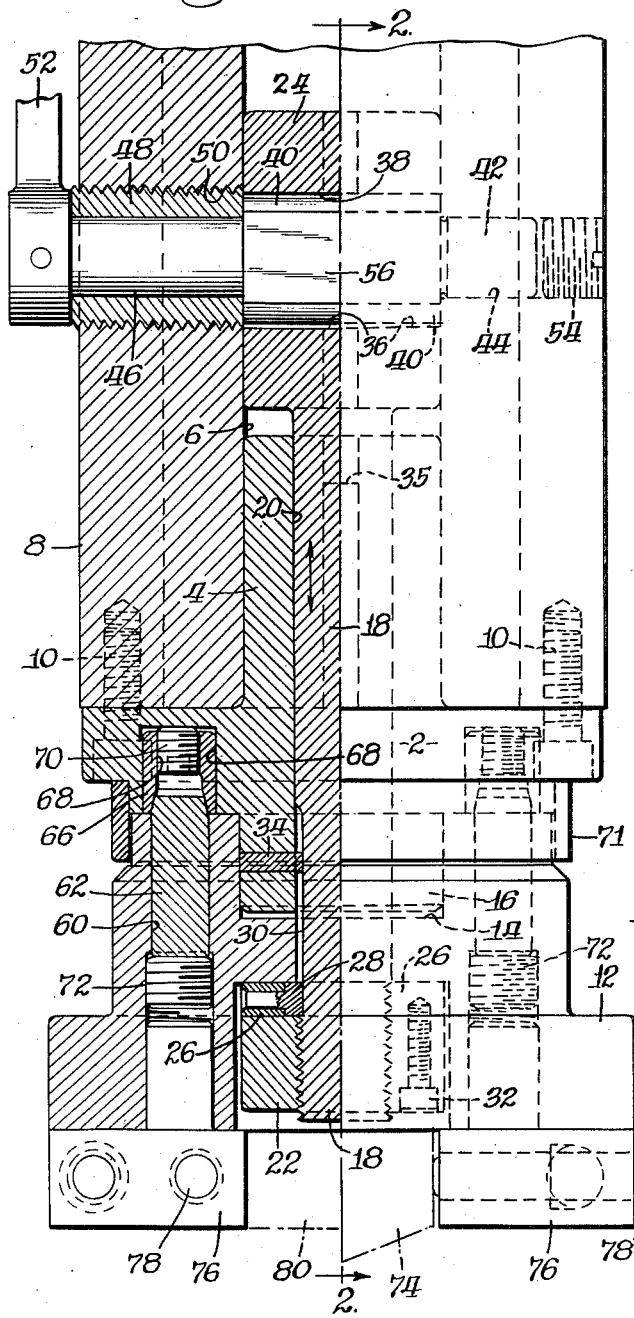
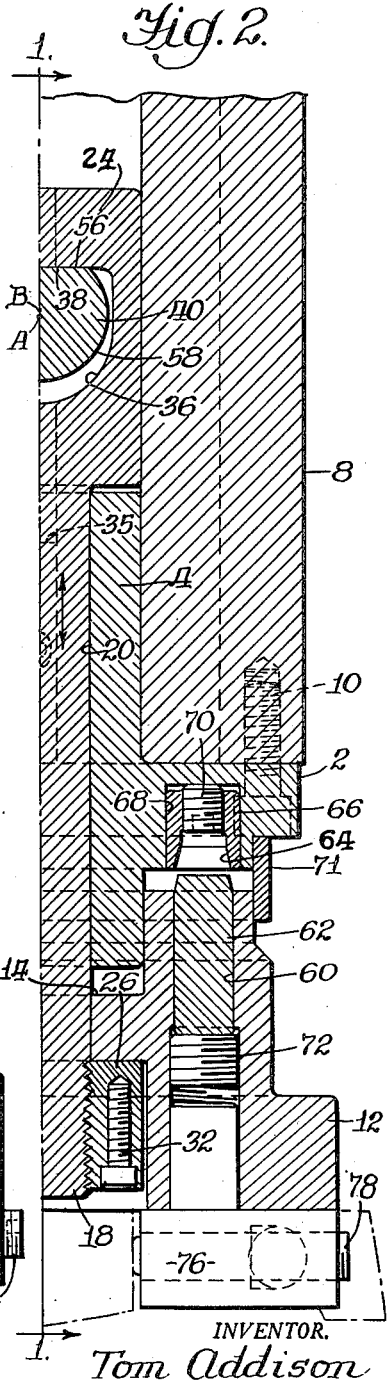
INVENTOR.
Tom Addison
BY
O. B. Garner
Atty.

Patented Apr. 27, 1954

2,676,500

UNITED STATES PATENT OFFICE 2,676,500

BORING MILL TOOLHOLDER

Tom Addison, Cincinnati, Ohio, assignor to American Steel Foundries, Chicago, Ill., a corporation of New Jersey Application June 20, 1951, Serial No. 232,645

5 Claims. (Cl. 77—58)

This invention relates to tool holders for use in material cutting or machining operations and is more particularly concerned with the provision of a turret type tool holder adapted for use on boring mills.

While turret type tool holders have heretofore been provided for use on boring mills, their use was somewhat limited due to their relatively large size as the tool block was often found to be larger than the bore or opening in the product to be machined, and the tool block was usually journaled for selective indexing movement about a horizontal axis perpendicular to the axis of rotation of the boring mill table and the work supported thereon.

The present invention contemplates the provision of a turret type tool holder in which the tool block employed to carry the cutting tools is mounted for axial and selective indexable movement on an axis parallel to the axis of rotation of the work supporting table of a boring mill, the tool block being journaled on a boss on the lower end of an index plate provided with an upwardly projecting shank for snug engagement within a tool receiving socket formed in a boring mill ram.

This invention further contemplates the provision of a turret type tool holder in which the tool block is adapted to be manually indexed to dispose one of the several cutting tools in desired position relative to the index plate; after which the tool block is secured against further indexing movement relative to the index plate during axial movement of the tool block toward the index plate.

With the above in mind the present invention additionally contemplates the provision of an indexable turret type tool holder mounting a plurality of tools, each tool being readily indexable into cutting position to contact the work. This type of tool holder has especial utility in boring operations. For example, rough, semi-finish and finish cutting tools may be mounted in the holder at a preliminary set up. The holder is then indexed to bring the rough turning tool into position to engage the work, the rough cut is then completed. The holder is then quickly and easily indexed to bring the semi-finish tool into work engaging position and the semi-finish boring operation is then completed. Lastly, the tool holder may be indexed to bring the finished tool into work engaging position and the finished boring operation is then completed.

It should also be readily apparent that particular tool holders disclosed can be used for other than boring operations, for example, turning and facing tools can be carried and turning and facing operations can be completed without the necessity of down time for additional set ups.

It will be readily apparent to those skilled in the art that considerable production time is saved by the use of a tool holder of this type inasmuch as the necessity of an individual tool set up for each operation is eliminated. It will also be readily apparent that the tool holder of this type can easily accommodate any group of distinct tools that may be required to complete a given machining sequence, for example, knurling or polishing tools in addition to the rough, semi-finish, turning, facing and finishing tools mentioned above.

This invention further contemplates the provision of a turret type tool holder embodying means provided on the index plate for interlocking engagement with means provided on the tool block when the latter is moved axially toward the index plate.

This invention further contemplates the provision of a turret type tool holder embodying a cam mechanism for imparting axial movement to the tool block relative to the index plate during selective adjustment of the tool block from station to station.

This invention further contemplates the provision of a turret type tool holder which is relatively simple and inexpensive in construction, reliable in operation, and which may readily be mounted upon or removed from the ram of a boring mill.

This invention embodies other novel features, details of construction and arrangement of parts which are hereinafter set forth in the specification and claims and illustrated in the accompanying drawing, wherein:

Figure 1 is a longitudinal sectional view illustrating a turret type tool holder embodying features of the present invention, and Figure 2 is a longitudinal sectional view taken along the line 2—2 of Figure 1, only half of the tool holder being shown as the structure is identical on opposite sides of the longitudinal axis of the tool holder.

Referring now to the drawing for a better understanding of the present invention, the tool holder is shown as comprising an index plate 2 provided with a shank 4 for snug sliding engagement within a tool holder receiving recess 6 formed in the ram 8 of a boring mill, the index plate being secured to the end of the ram by means of cap screws 10.

A tool block 12 is bored at 14 to slidably receive a cylindrical journal 16 formed on and projecting from the lower face of the index plate 2. The tool block 12 is supported upon the lower end of a shaft 18 mounted for reciprocative movement within a bore 20 extending axially through the index plate 2, shank 4 and journal 16. The lower end of the shaft 18 is threaded to receive a nut 22, and the upper end of the shaft is formed with a cylindrical head 24 for reciprocative movement within the bore 6 of the ram 8. A thrust washer 26 is mounted on the shaft 18 between the nut 22 and the tool block 12 and is provided with a key 28 for sliding engagement within a keyway 30 formed in the shaft 18. The key 28 acts to prevent rotational movement of the thrust washer 26 relative to the shaft 18 during selective indexing of the tool block 12 relative to the index plate 2. The nut 22 is secured against rotational movement relative to the shaft 18 and the thrust washer 26 by means of a cap screw 32.

The shaft 18 is engaged against rotational movement relative to the index plate 2 by means of a key 34 mounted on the journal 16 for sliding engagement within the keyway 30. To insure proper alignment of the face plate 2 with respect to the ram 8, a key 35 is secured in the bore 6 of the ram for engagement within a key slot formed in the shank 4.

The head portion 24 of the shaft 18 is formed with an aperture 36 having a flat upper surface 38 for engagement by a cam 40 journaled at its ends in suitable bearings provided in the ram 8. As illustrated in Figure 1, one end of the cam 40 is formed with a stud shaft portion 42 for rotational movement within a bearing aperture 44 formed in the ram 8, while the other end of the cam is formed with a shaft 46 journaled in a bushing 48 engaged within a threaded aperture 50 formed in the ram. A handle 52 is keyed to the outer end of the shaft 46 to permit manual rotation of the cam 40 in raising or lowering the shaft 18. A plug 54 is secured within the outer end of the bearing aperture 44 formed in the ram to prevent the passage of dirt into and through the bearing aperture. As illustrated in Figure 2, the cam 40 is formed with a flat surface 56 for engagement against the surface 38 of the shaft head 24 when the tool block 12 is disposed in its lower position for indexing movement relative to the index plate 2. The cam 40 is also formed with an arcuate surface 58 having its axis A offset from the axis B of the shafts 42 and 46.

The tool block 12 is provided with a plurality of circumferentially spaced plug apertures 60 to slidably receive cylindrical plugs 62. The plugs are formed tapered at their upper ends for engagement in tapered openings 64 formed in sockets 66 provided on the index plate 2. The sockets 66 are snugly but slidably engaged within cylindrical openings 68 formed in the lower face of the index plate. Each socket 66 is provided with a threaded opening to receive an adjustment screw 70 adapted to engage against a wall at the inner end of its respective opening 68. Adjustment screws 72 are provided on the tool block to engage against the inner ends of their respective plugs 62. The sockets 66 are equally spaced about the axis of the index plate 2 and the number of sockets employed in the tool holder is dependent upon the number of tool stations provided on the tool block 12. For example, four sockets 66 spaced 90° apart would be provided with a tool block having four tool stations disposed 90° apart. It is apparent that it would not be necessary to provide a plug 62 for interlocking engagement with each of the sockets 66 as a single plug could be employed for interlocking engagement within the several sockets during indexing of the tool block from station to station. However, by providing a plug 62 for interlocking engagement with each socket 66, a more rigid tool holder construction is provided.

The lower face of the tool block 12 is formed in the conventional manner to receive and engage tool bits 74 which are radially disposed about the axis of the tool holder. In the present construction, the tool holder is provided with four lugs 76 formed with threaded apertures to receive locking screws 78 employed to clamp the tool bits in position, as illustrated in Figure 1. If desired, a suitable filler block 80 may be interposed between a lug 76 and its respective tool bit 74. A sleeve 71 is secured to the index plate 2 to enclose the upper end of the turret block 12 to prevent dirt or metal chips from entering the space between the tool block and the index plate.

In the operation of the turret type tool holder thus shown and described, the tool block 12 is moved axially from its locked position illustrated in Figure 1 to it unlocked position illustrated in Figure 2 by manual rotation of the handle 52 and cam 40. As the tool block moves away from the index plate 2, the plugs 62 are withdrawn from their respective sockets 66 to permit manual indexing of the tool block about the journal 16. After the tool block has been indexed to selected position, the handle 52 and cam 40 are rotated to the position illustrated in Figure 1 to engage the plugs 62 within tapered recesses 64 formed in the sockets 66. To insure snug engagement between the plugs 62 and the sockets 66 when the tool block is in its locked position, the adjustment screws 70 and 72 are provided to permit adjustment of the sockets 66 and plugs 62 respectively. When the tool holder is being employed in machining products, it will be noted that the journal 16 provided on the index plate acts to resist lateral thrust of the tool block 12 and that the plungers 62 only act to resist rotational movement of the tool block around the journal 16.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a turret type tool holder for use on a boring mill ram, an index plate having a shank coaxially therewith for engagement within a tool socket of a ram, a tool block journaled on said plate for rotatable indexing and axial movement relative thereto and disposed on a common axis with the plate and shank, cam actuated means to move said block axially relative to said plate, and interlocking means to prevent rotational movement of said block relative to said plate when the block is moved axially into abutting engagement against said plate.

2. In a turret type tool holder for use on a boring mill ram, an index plate having a shank coaxially therewith for engagement within a tool socket of a ram, a tool block journaled on said plate for rotatable indexing and axial movement relative thereto and disposed on a common axis with the plate and shank, means to move said block axially relative to said plate, sockets circumferentially spaced around the axis of said plate, and a plug provided on said block for engagement within a selected socket when the block is moved axially into abutting engagement against said plate, said block being provided with tool engaging means adapted to secure cutting tools in spaced relation about the periphery of the block, and means to secure said plate to the end of a ram.

3. In a turret type tool holder for use on a boring mill ram having a tool socket, an index plate including a shank to be engaged in a tool socket, a tool block journaled on the opposite side of said plate from said shank for axial and rotatable indexing movement, a shaft rotatably connected to said block and extending through said plate and shank, cam means engaging the other end of said shaft and operable to move the block axially into abutting engagement against said plate, means to interlock the plate to the block when the latter is moved into abutting engagement against the plate, and means to prevent rotational movement of said shaft relative to said plate and shank.

4. In a turret type tool holder for use on a boring mill, the combination with a ram having a tool holder socket, of an index plate secured on said ram and including a shank extending into said socket, a tool block journaled on the opposite side of said plate from said shank for rotatable indexing and axial movement on an axis parallel to the longitudinal axis of the ram, locking means to interconnect said plate and block at various selected points to prevent rotational movement of the block relative to the plate, and means to move said block axially into and out of locking engagement with said plate comprising a shaft, and a cam journaled on said ram to move said shaft axially.

5. In a turret type tool holder for use on a material forming machine, an index plate, a tool block journaled on said plate for rotatable indexing and axial movement, a shaft connected to said block and projecting through said plate to move said block toward said plate, locking cam means to interlock said block against rotation relative to said plate, and cam means to move said shaft axially.

References Cited in the file of this patent

UNITED STATES PATENTS

| Number | Name | Date |
|---|---|---|
| 576,305 | Feltch et al. | Feb. 2, 1897 |
| 1,306,185 | Kelly | June 10, 1919 |
| 1,361,198 | Strand | Dec. 7, 1920 |
| 2,430,263 | West | Nov. 4, 1947 |

FOREIGN PATENTS

| Number | Country | Date |
|---|---|---|
| 314,850 | Germany | Oct. 15, 1919 |